US007100835B2

(12) United States Patent
Selker

(10) Patent No.: US 7,100,835 B2
(45) Date of Patent: Sep. 5, 2006

(54) METHODS AND APPARATUS FOR WIRELESS RFID CARDHOLDER SIGNATURE AND DATA ENTRY

(75) Inventor: Edwin Joseph Selker, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 198 days.

(21) Appl. No.: 10/646,597

(22) Filed: Aug. 23, 2003

(65) Prior Publication Data

US 2004/0124248 A1    Jul. 1, 2004

Related U.S. Application Data

(63) Continuation-in-part of application No. 10/334,572, filed on Dec. 31, 2002, now Pat. No. 6,863,220.

(51) Int. Cl.
G06K 19/06    (2006.01)
G06K 7/08    (2006.01)

(52) U.S. Cl. ........................ 235/492; 235/451

(58) Field of Classification Search ............... 235/492, 235/451, 487; 257/679; 340/572.1, 10.33; 361/737
See application file for complete search history.

(56) References Cited

U.S. PATENT DOCUMENTS 5,884,271 A * 3/1999 Pitroda ........................ 705/41
6,424,029 B1 * 7/2002 Giesler ........................ 235/492
6,588,660 B1 * 7/2003 Buescher et al. ........... 235/492
6,690,556 B1 * 2/2004 Smola et al. ................ 235/492
6,830,193 B1 * 12/2004 Tanaka ........................ 235/492
2004/0210926 A1 * 10/2004 Francis et al. ................ 725/25
2006/0040704 A1 * 2/2006 Bayley et al. ............ 340/572.1

FOREIGN PATENT DOCUMENTS

JP    7-249109 A   *  9/1995
JP    11-212923 A  *  8/1999

* cited by examiner

Primary Examiner—Jared J. Fureman
(74) Attorney, Agent, or Firm—Charles G. Call

(57) ABSTRACT

A radio operated data card whose outer jacket forms a sealed protected housing for internal electrical components, including an RFID integrated circuit which incorporates data storage and a radio frequency transceiver, and one or more on-card antenna structures. Manually operated electrical switching elements, or antenna structures which are responsive to the positioning of conductive members, such as the human hand, at particular locations on or near the surface of the card, are connected to the on-card electronic circuitry. The switching elements or antenna elements are selectively operated by the cardholder who manipulates the card in predetermined ways to generate data signals that may be used to activate the card, store data in the card, or transmit data to the reader.

15 Claims, 6 Drawing Sheets

METHODS AND APPARATUS FOR WIRELESS RFID CARDHOLDER SIGNATURE AND DATA ENTRY

CROSS REFERENCE TO RELATED APPLICATIONS

This application is a continuation impart of U.S. patent application Ser. No. 10/334,572 filed Dec. 31, 2002, now U.S. Pat. No. 6,863,220 issued Mar. 8, 2005, the disclosure of which is hereby incorporated herein by reference.

FIELD OF THE INVENTION

This invention relates to radio frequency identification (RFID) systems and more particularly to RF data cards carried by cardholders.

BACKGROUND OF THE INVENTION

Electronically read credit cards may be targeted for theft and misuse. Readily available card readers can be used by a thief to obtain account information from the card. While magnetic strip and contact-bearing cards are protected to some extent by the fact that the card must be in physical contact with the reader, contactless cards that use radio signaling to exchange information with a host system can be used without bringing it into direct contact with a reader. Because such contactless devices can be read at a distance with a suitable transmitter and receiver, it is possible to surreptitiously obtain information from the card while it remains in its cardholder's possession. In addition to non-contact data transfer, wireless communication can also allow non-line-of-sight communication, meaning that an RF-enabled device may be read while it remains in the cardholder's wallet or purse.

U.S. Pat. No. 6,863,220 issued to Edwin J. Selker describes contactless information storage devices, such as an RFID payment cards, that are protected against unauthorized misuse. The card employs an internal mechanism that normally disables the on-card electronic circuitry until the mechanism is intentionally actuated by the cardholder. The mechanism prevents the information on the card from being accessed until the cardholder activates the mechanism to enable signal transmission between the card and the remote unit. In one embodiment, user- activated, normally open electrical switch contacts connect the on- card electronic circuitry and an on- card antenna. Until the contacts are intentionally closed by the cardholder, the antenna is disconnected to prevent the card from transmitting or receiving information. After the user intentionally closes the switch contacts when the card is being used to provide information to an authorized remote reader/transmitter, the contacts automatically reopen to prevent the card from being accessed. In an alternate embodiment, a mating key in the possession of the cardholder must be brought into proximity with the card to close the normally open switch in the card to permit information to be read from the card.

As further described in U.S. Pat. No. 6,863,220 and in the specification that follows, the on- card switching mechanisms described above may be used to selectively connect the chip electronics to different portions of the on-card antenna, allowing the card to he selectively tuned to different resonant frequencies. The card may be pressed in different positions to activate different switching elements, and different keys, or different placements of a single key, may be used to selectively close only certain on-card switches to provide the needed connections.

These on-card, cardholder-operated switching devices provide a needed mechanism that enables the cardholder to input additional identification or control information that provides additional security and functionality.

The internal mechanism used to generate data in response to the selective manipulation of the card by the cardholder must be flat enough to fit in the limited space available in a card meeting relevant ISO standards, must be robust enough to withstand stress and abuse, and must employ low-cost components and be easy to assemble and produce in quantity. In addition, the mechanism must not be potentially harmful to users due by introducing sharp or pointed edges, leak fluids, or contain a substance that might trigger allergic reactions. In addition, the mechanism employed should be functionally flexible in order to work in cards and other devices having a variety of shapes and sizes. Finally, the mechanism should be able to control the on-card electronics, typically a mass-produced integrated circuit chip, regardless of whether the chip is internally or externally powered.

SUMMARY OF THE INVENTION

In accordance with the invention, control signals produced by manually activated, on-card sensors are used to indicate the position where the cardholder touches the card, or the timing when the card is touched, or both. The sensors may detect a characteristic "signature" motion of the nearby conductive object, such as the cardholder's finger.

The cardholder-operated on-card sensors may consist of a plurality of sensing elements positioned at different locations on said card to generate control signals indicating which of said sensing elements is activated by said selective manipulation by said human cardholder.

The control signals generated by the cardholder's manipulation of the card may be used to enable data exchanges between the card and the reader only when the control signals satisfy predetermined conditions. In addition, the control signals may be used to store data in the card's memory that is specified by the cardholder, and/or to transmit such cardholder entered data to the remote reader.

In one embodiment, the present invention takes the form of a data card carried by a cardholder which includes an on-card antenna, a data memory, and a transceiver for electromagnetically transferring data between the memory and a remote reader, with the card further including a user-activated electrical switching circuit for generating a plurality of control signals in response to the selective manipulation of the data card by a human cardholder, and means for controlling the transfer of data via said transceiver in response to the control signals. The switching elements act as sensors for detecting the application of pressure to the surface of the RFID card. In an alternative embodiment, the control signals may be generated by one or more antenna elements whose gain, Q or resonant frequency is altered by the presence of proximate conductive object, such as the cardholder's finger or a conductive stylus. The sensing elements may also take the form of spaced-apart conductive elements which are capacitively coupled together by the presence of a nearby conductive element.

In further embodiments, the card for exchanging data between said RFID card and a remotely located card reader electromagnetically coupled to said card responds to a sequence of cardholder-produced events. At least one sensor on the card is operable by said cardholder to generate a plurality of control signals indicating a corresponding sequence of touch events when said card is being manipulated by said cardholder, and means responsive to said control signals control the data stored in the RFID card or exchanged between said card and said card reader.

The control signals produced by the on-card switching circuit may indicate the indicate the timing and/or position of a sequence of said touch events which occur as the cardholder manipulates the card.

The sensing elements on the card may be connected to the on-card antenna such that, when the sensing elements are selectively activated by the cardholder, the gain or resonant frequency of the antenna is varied. These changes in the characteristics of the antenna circuit may be sensed by the on-card electronics, or by the remote reader, to enable the cardholder to enter data or control the operation of the card by selectively touching the card's surface. Alternatively, the gain, Q or resonant frequency of one or more on-card antenna elements may be directly altered by the presence of nearby conductive elements without the use of separate switching elements.

The sensing elements on the card may take the form on a cardholder operated data entry keypad used for such purposes as accepting a personal identification number (PIN) from the cardholder, responding to prompts from the reader, or designating dollar amounts or other quantities used by when the data card exchanges information with the reader.

In other embodiments, the position and distance of the cardholder's hand or finger, or any other electrically conductive object, relative to one or more on-card antenna structures, alters the resonant frequency, selectivity (Q), and/or the signal transmitting capability (gain) of the antenna structure. As the characteristics of the antenna change, an on-card or remote sensor may be employed to detect changes in the properties of the antenna to determine whether or not the card is being held or manipulated by the cardholder in a particular way. For example, the detector may sense whether the cardholder's finger or thumb is placed in the center, edge or a corner of the card, or whether the cardholder has touched the card a particular time sequence. The cardholder may accordingly be directed to manipulate the card in a particular way when presenting the card for identification. It the card is not presented in the proper way, the remote sensor will not accept the card as valid and will not exchange information with the card.

The on card antenna may exhibit preferential response to the presence of a conductive object positioned proximate to a predetermined region of said card; for example, a single antenna may have an asymmetrical form with respect to the card, or be positioned at a particular location on the card, or the antenna may be formed from multiple structures to provide anisotropic properties, such as a plurality of different, spaced-apart windings or patch antennas. A detector responsive to the change in the antenna's properties positioned either on the card or remotely from the card may sense the presence of a conductive object proximate to a particular region of the card. The detector may be responsive to the effect that the presence of the object has on the gain, Q, or resonant frequency on the on-card antenna structure.

The on-card switching element(s), or the object position sensor(s), can be used to identify the person's "signature" of finger motions on the card for personal identification, the switching element(s) and/or sensor(s) may also form virtual or actual buttons, sliders, a keypad, etc. on the card which permit the cardholder to activate the card or enter data. The use of a conductive stylus or other conductive object designed to disturb the electrical, magnetic or electromagnetic properties of the card may be used instead of the cardholder's finger or hand to improve the precision of the location detection mechanism.

The electrical switching elements used to perform these functions can be implemented inexpensively using mechanism which require few if any mechanical parts for measuring the proximity of the user's hand, finger, thumb or other conductive member with respect to predetermined areas on the card. By using a sensing mechanism that effects the gain or resonant frequency of the antenna, the sensing function may be performed as a part of signal transmission and can be implemented either on the card or the card reader, and enables the cardholder to identify herself without requiring a complex biometric sensor.

These and other features and advantages of the present invention may be more clearly understood by considering the following detailed description of specific embodiments of the invention.

BRIEF DESCRIPTION OF THE DRAWINGS

In the detailed description which follows, frequent reference will be made to the attached drawings, in which.

DETAILED DESCRIPTION

Figure 1:
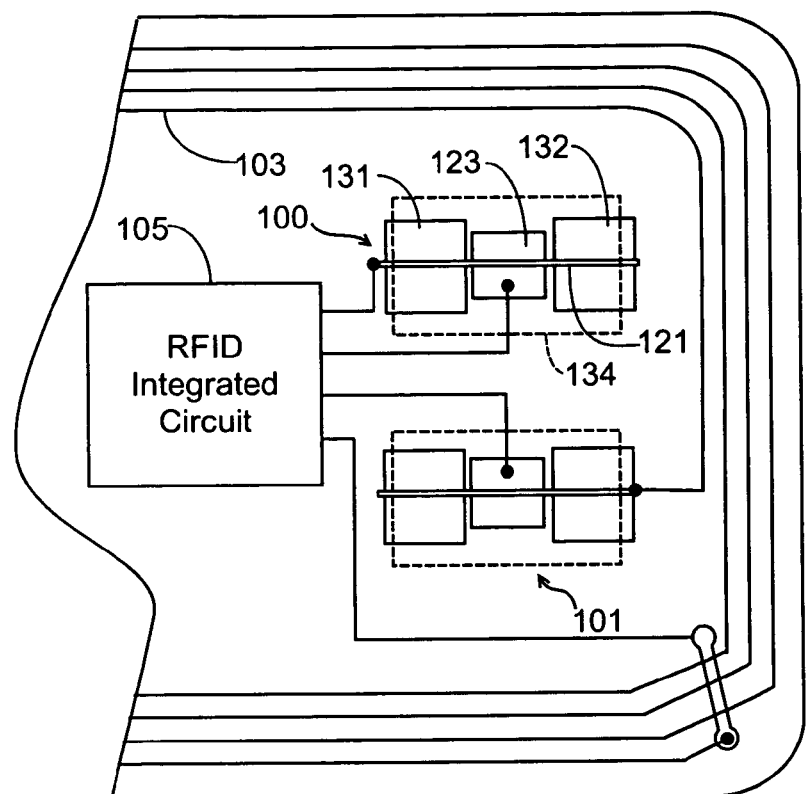
FIG. 1 is a plan view of an RF-enabled card which employs pressure-actuated manual switches for varying the resonance and/or gain of an on-card antenna.

RF-enabled cards, identification tags, security passkeys and the like (hereinafter collectively referred to as "cards" or "data cards") carry data which typically identifies or relates to a specific person, a particular account, an individual vehicle, or a particular item, and further contains additional data supporting applications through item specific information or instructions that can be made immediately available by reading the card.

A RFID system requires, in addition to the data cards, a means of reading or interrogating the data cards and communicating data between the card and a host computer or an information management system (hereinafter referred to as a "reader"). Communication of data between the cards and a reader is achieved by wireless communication, either based upon close proximity electromagnetic or inductive coupling, or based upon propagating electromagnetic waves. Coupling is achieved using antenna structures forming an integral feature in both data cards and readers. As used here, the term "antenna" refers to both propagating systems as well as inductive systems.

Data storage and processing as well as RF communications functions are typically performed on the data card by one or more integrated circuit chips. For example, the SRIX4K Smartcard Chip available from STMicroelectronics is a integrated a power reception system which uses the received RF signal as a power source, an emitter/receiver module compatible with the ISO 14443 standard, together with an asynchronous 8-bit micro-controller. The chip contains a 4096-bit user EEPROM fabricated with CMOS technology and stores data in 128 blocks of 32 bits each. The SRIX4K is accessed via the 13.56 MHz carrier. Incoming data are demodulated and decoded from the received amplitude shift keying (ASK) modulation signal and outgoing data are generated by load variation using bit phase shift keying (BPSK) coding of a 847 kHz sub-carrier. The SRIX4K chip is further described in the paper "A New Contactless Smartcard IC using an On-Chip Antenna and an Asynchronous Micro-controller" by Abrial A., at al., 26th European Solid-State Circuits Conference, Stockholm, September 19, 20, 2000. Using the STMicroelectronics single chip coupler, CRX14, a reader may be readily designed to create a complete a RFID system.

Although these and other such systems include electronic authentication mechanisms for enhanced security, it is nonetheless desirable to enhance the security of the information on the data card by affirmatively disabling the data card or the data transfer process except when the holder intends to use it. As an additional safeguard, or to provide additional functionality to the card, it is also desirable to provide a sensing mechanism, either on the card or at the card reader, that can detect the particular manner in which the card is being manipulated by the user. In the arrangements to be described, on or more sensing elements are placed on the card to respond to manipulation of the card by the cardholder. These sensing elements can take a variety of forms, including mechanical switches which respond to the application of pressure to the cards surface by the cardholder, capacitively coupled conductive elements which act as switches actuated by the presence of a nearby conductive object such as a human finger or a conductive stylus, and antenna structures whose operating characteristics (gain, Q or resonant frequency) is altered by the presence of a nearby conductive object.

In one preferred embodiment of the invention illustrated in FIG. 1, an on-card electrical switching circuit senses the manner in which the cardholder touches the card at different points to create input data that may be use to provide control commands which activate the card or which provide additional control information to the on-card integrated circuit or to the reader.

The RFID card 100 in FIG. 1 contains two low-cost, user-operated, pressure responsive switch mechanisms 101 and 102. The switches 101 and 102 are both normally open and either may be individually closed when the cardholder presses resilient surface of the card adjacent to the switch. Normally open switch 101 disconnects the antenna 103 from the on-card integrated circuit 105 when the card is not in use. When the switching mechanism 101 is closed by the cardholder, the antenna 103 is connected to the IC 105.

The antenna 103 is formed by a helical conductive trace which follows the outer periphery of the card 100. Helical trace antennas of this kind are available from RCD Technology Corporation, Bethlehem, Pa. A helical antenna, dipole, folded dipole or other suitable antenna may be combined with an on-card capacitor (not shown in FIG. 1) to provide a circuit that is resonant at the operating frequency of the RF signal. In a passive RFID card, the resonant circuit antenna may be used to both exchange data with and receive operating power from a reader as described in U.S. Pat. No. 6,496,113 issued to Lee et al. on Dec. 17, 2002, the disclosure of which is incorporated herein by reference. U.S. Pat. No. 6,100,804 issued to Brady et al. on Aug. 8, 2000, the disclosure of which is also incorporated herein by reference, describes the construction of a RFID identification tag employing a resonant folded dipole antenna formed as an integral part of the tag. These and other antenna configurations known in the art may be used to implement the present invention.

In the exemplary embodiment described in FIGS. 1–4, the switch 102 is connected between two external terminals of the IC 105 and operates as an input "key" which the cardholder presses in a predetermined way when it is desired to activate the card. For example, when the card is issued to the cardholder, the cardholder may be instructed to first close switch 101 (by pressing the card surface adjacent to switch 101), then close switch 100 twice in succession, and then close switch 101 once again. The IC 105 exchanges information with the remote receiver only when this predetermined sequence of switch closures is sensed.

Figure 4:
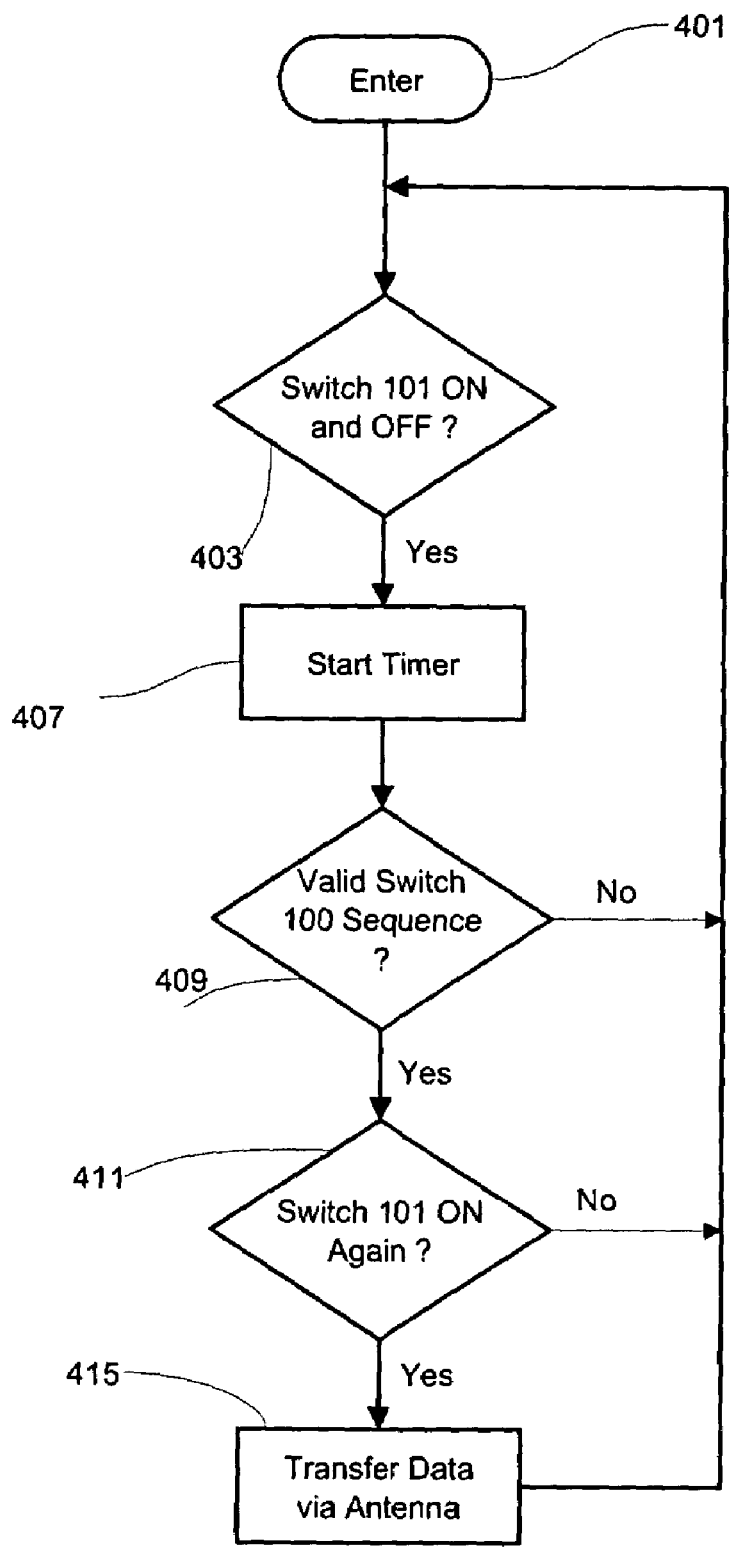
FIG. 4 is a flow chart depicting an illustrative mode of operation for the card shown in FIGS. 1–3.

This predetermined event sequence is illustrated in the flowchart shown in FIG. 4. When the switch 101 is ON as indicated at 403, the IC 105 is powered up at 407, either from an on-card battery source in the case of an "active" card, or from power received via the antenna 103 when the switch 101 is ON and the card is sufficiently near the RF power source provided by the remote receiver. When the IC 5 is functioning, an internal timer is started so that the duration and time position when switch 100 can be monitored. If the switch 100 is turned ON and OFF twice within a first predetermined time window as indicated at 109, the IC 105 then determines whether switch 101 is turned ON again within a predetermined time after the second closure of switch 100. If the switch 101 is turned ON again as indicated at 411, the IC 105 proceeds with the attempt to exchange information with the receiver (which may envolve additional validation steps).

Figure 2:
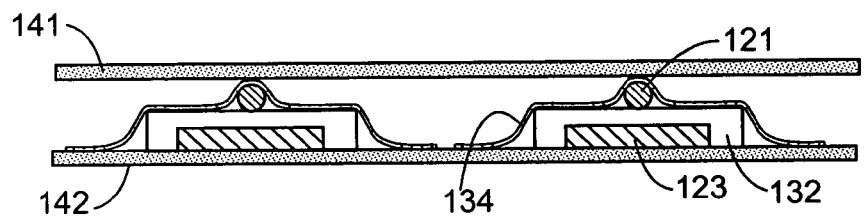
FIGS. 2 and 3 are cross-sectional views of the switch mechanism used in the card of FIG. 1 shown with one of the two switches in its normal and actuated states, respectively.
Figure 3:
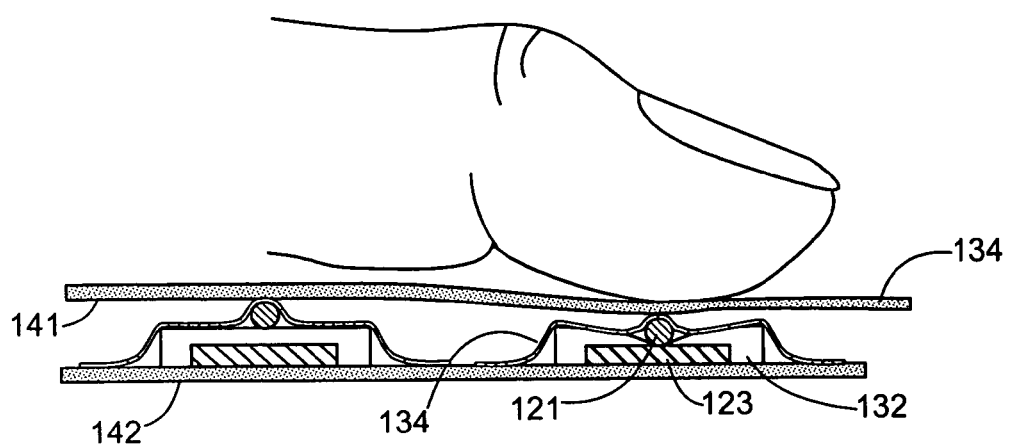

The switch mechanisms 100 and 101 are both seen in cross-section in FIGS. 2 and 3, and operate and the same fashion. The switch 100 includes a wire conductor 121 held in a normally spaced-apart relationship from an electrical contact pad 123 by a two support cushions 131 and 132. The cushions 131 and 132 are formed of a resilient material and are positioned on each side of the contact pad 123. The wire 121 is secured by a thin adhesive strip 134 indicated by the dotted rectangle in FIG. 1. The switch assembly 100 is sandwiched between two planar panels 141 and 142 (seen in FIGS. 2 and 3) which form the outer surfaces of the card 101 and which also house the integrated circuit 105 and the antenna 103. The panels 141 and 142 are attached at their periphery to form a sealed housing for the on-card electronics, switching mechanisms and antenna, and may be formed using any suitable non conducting material. The resilient cushions 131 and 132 deform, allowing the wire 121 to move into engagement with the contact pad 123 to establish and electrical connection. Note that the wire 121 may be relatively rigid and move downwardly with the resiliency being supplied primarily by the supporting cushions. Alternatively, the wire may be flexible and resilient and be supported at its ends above the contact pad 125 at one or both ends. In the latter case, the wire acts as a spring, its resiliency preventing it from making contact until the surface of the data card is pressed, and when pressure is released, the wire pops back up, breaking the contact. Other types of on-card, manually operated switching arrangements, including those described in U.S. Pat. No. 6,863,220 issued to by Edwin J. Selker, may be employed to implement the invention.

Figure 5:
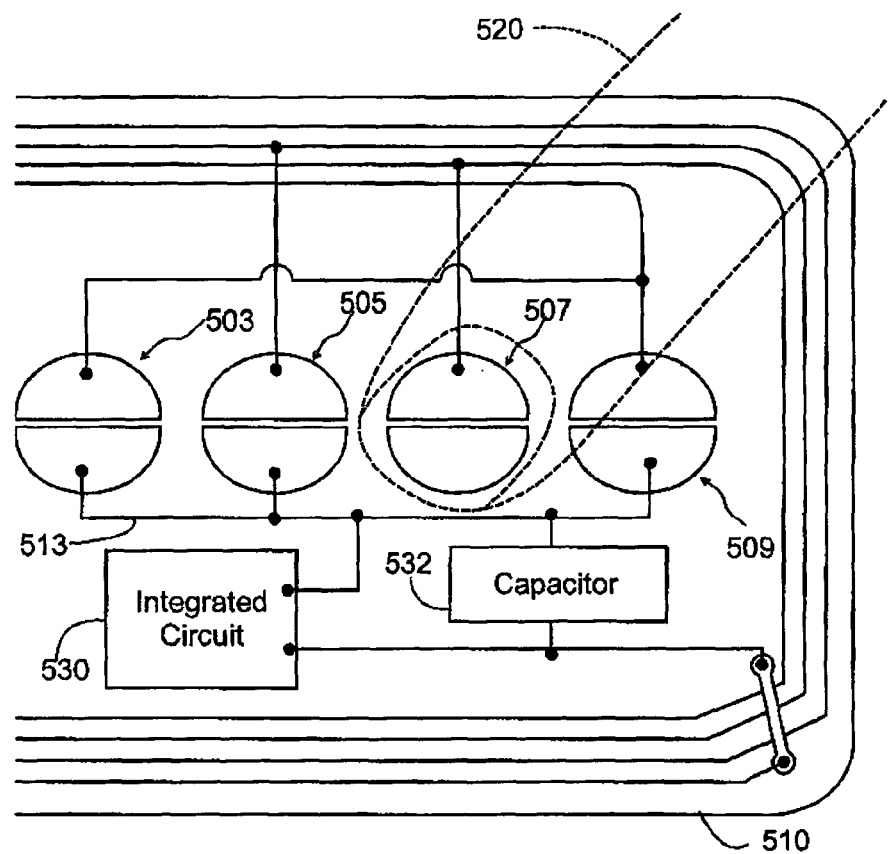
FIG. 5 is a plan view of an RF-enabled card which employs capacitive coupling to different parts of the on-card antenna to cause a distinctive change in the gain or resonant frequency of the antenna when the card is manipulated in a predetermined manner by the cardholder.

A second embodiment of the invention is shown in FIG. 5. In this arrangement, the switching functions that are responsive to the selective manipulation of the card by the cardholder are implemented by the capacitive coupling between pairs of conductive areas that occurs when the cardholder's finger or thumb is placed adjacent to one of these pairs. These conductive areas are on or near the surface of the card 501 and consist of four pairs of adjacent semicircles seen at 503, 505, 507 and 509. When the cardholder touches the card in the vicinity of one of the pairs of semicircles, as illustrated in FIG. 5 by the cardholder's finger 520 touching the card 501 over the pair of semicircular areas at 507, RF energy flows by capacitive coupling between the pair of semicircular areas and effectively connects a predetermined portion of the helical antenna 510 to conductor 513. Conductor 513 is connected to one input terminal of an on-card integrated circuit (IC) 530 and to one side of an on-card capacitor 532, the other terminal of which is connected to a second input terminal of the IC 530.

Figure 6:
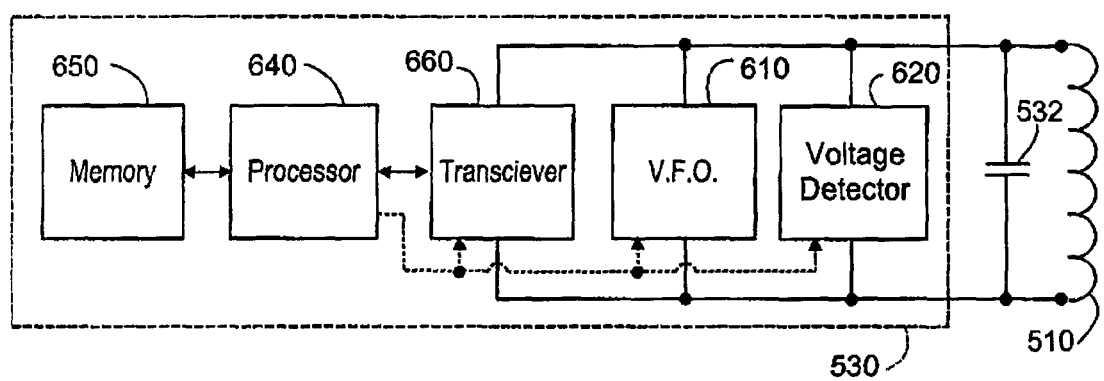
FIG. 6 is a schematic block diagram of the on-card electronics used to exchange data with a remote host system and to detect the manner in which the cardholder selectively touches the card for identification.

As the cardholder's finger or thumb is moved to touch any one of the four pairs of semicircular areas 503–509, all or part of the helical antenna 510 is connected by capacitive coupling to the IC 530 and the capacitor 532. When the cardholder's finger or thumb is moved from one pair of semicircular areas to another, a different portion of the antenna 510 is connected, changing the resonant frequency of the combined circuit. This change in resonant frequency can be sensed by either the on-card IC 530 or by the reader which is electromagnetically coupled to the on-card resonant circuit. As illustrated in FIG. 6, the on-card integrated circuit may include a variable frequency oscillator 610 which applies an output signal having an RF component that cyclically varies between the different resonant frequencies assumed by the antenna circuit as the cardholder's finger is moved. When an RF component of the signal generated by the VFO 610 approaches the resonant frequency of the connected antenna 630 and capacitor 640, the voltage across the capacitor and antenna increases markedly, as sensed by the voltage detector 620.

In the example of FIG. 5, when the cardholder's finger or thumb is not touching either or the outermost areas 503 or 509, substantially all of the helical antenna 510 is connected to the capacitor 532, and the antenna circuit accordingly has the greatest inductance and the lowest resonant frequency. When the cardholder's finger is positioned over the area 507 as shown by the dashed line finger outline 520 in FIG. 5, the innermost winding of the antenna 510 is bypassed, an the antenna circuit resonates at an intermediate frequency. When the cardholder's finger is moved adjacent to the area 505, the two innermost windings of the antenna 510 are bypassed, at the antenna circuit resonates at the highest frequency. As the frequency of the output signal from the variable frequency oscillator 610 approaches the resonant frequency of the antenna circuit, the impedance of the circuit increases and the voltage across the parallel combination of the antenna 510 and the capacitor 532 increases to a maximum. By detecting the frequency at which the voltage peaks using the voltage detector 620, the integrated circuit 530 can determine the location at which the cardholder is touching the card.

The processor 640 may be programmed to perform the functions of the VFO 610 by generating digital signal patterns having different repetition rates, and may include an analog-to-digital converter that performs the voltage sensing function illustrated at 620 to detect the frequency at which the connected antenna circuit resonates (and hence the position of the cardholder's finger or thumb as the card is being manipulated). As in the example illustrated in FIGS. 1–4, the processor 610 may be programmed to enable the transceiver 660 to exchange information with the remote reader only when the cardholder manipulates the card in a predetermined way. Thus, for example, if the cardholder's finger or thumb is moved back and forth across the areas 503 through 509, the sensed resonant frequency of the card switches in the sequence (1) low, (2) intermediate, (3) high (4) low as the finger or thumb is moved inwardly from one end to the center of the card, and in the sequence (1) low (2) high (3) intermediate (4) low as the finger is moved in the opposite direction outwardly from the center to the end of the card. The cardholder may accordingly be directed repeat this motion several times to enable the card. Alternatively, as another example, the reader may respond "yes" or "no" to prompting questions from the reader by moving her finger in one direction or the other. In another arrangement, different areas of the card associated with different detectable touching positions may act as a small keyboard, enabling the user to enter data which is sensed by the processor 640, stored temporarily in the memory 650, and then transmitted as data to the remote reader using the transceiver 660.

The sensor for detecting the changes in the operating characteristics of the on-card antenna structure may alternatively be located at the remote reader. In this case, a variable frequency interrogating signal is transmitted from the reader to the card. An on-card voltage detector may be used as shown in FIG. 6 to detect when the inducing frequency matches the resonant frequency of the card. Alternatively, a sensor (such as an peak amplitude detector or a standing wave ratio detector) at the remote reader may be used to detect when the applied frequency matches the current resonant frequency of the on-card antenna.

As discussed later in connection with FIGS. 8–13 of the drawings, a variety of different antenna structures which are responsive to the proximity of a conductive object may be employed to detect the manner in which the card is manipulated by the cardholder.

Figure 7:
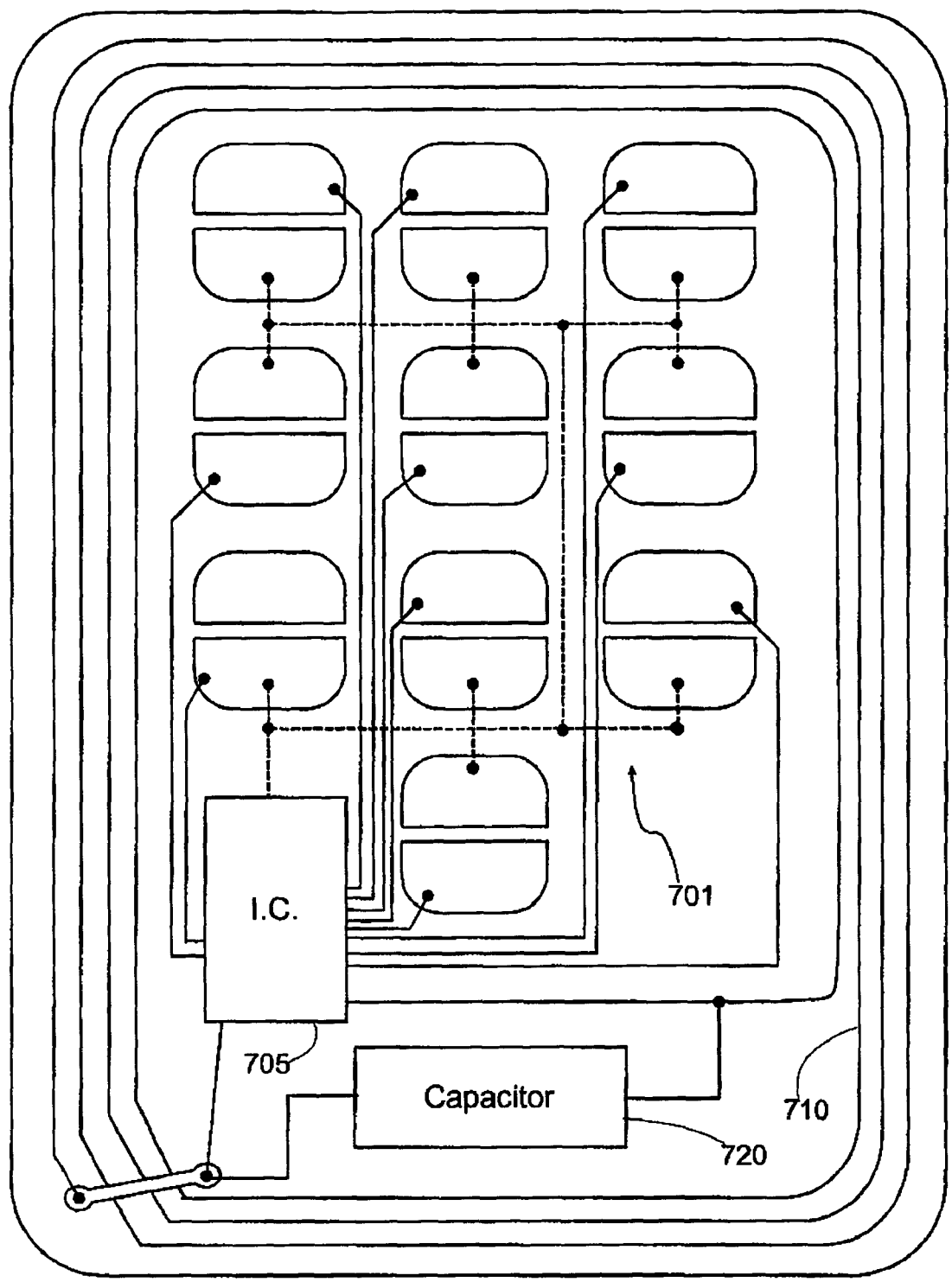
FIG. 7 is a plan view of an RF-enabled card the employs multiple capacitive switches to form a keypad with which a cardholder may enter data stored or transmitted by the card.

FIG. 7 of the drawings illustrates still another embodiment of the invention in which a set of ten on-card switches is arranged in a telephone-style keypad arrangement as indicated generally at 701. Each switch in the keypad 701 consists of a pair of adjacent conductive areas that is connected together by capacitive coupling when the cardholder touches the card adjacent those areas. The ten switches are connected to separate input terminals of an on-card integrated circuit 705 which communicates with a remote reader via a resonant antenna circuit consisting of the helical windings 710 around the periphery of the card and an on-card capacitor 720. Using an on-card keypad of the kind illustrated in FIG. 7, the cardholder may enter data such as a PIN number for validating a transaction with a receiver, or responding to a menu of choices presented to the cardholder by the reader, or for entering data (such as a dollar amount to be transferred from one account to another or dispensed as cash by a card-accessed ATM machine or the like).

The invention may also be implemented by using a plural spaced-apart antennas, or a single asymmetrical antenna, to provide anisotropic properties that are sensitive to both the presence and position of a nearby conductive object, such as a human finger or a conductive stylus.

Figure 8:
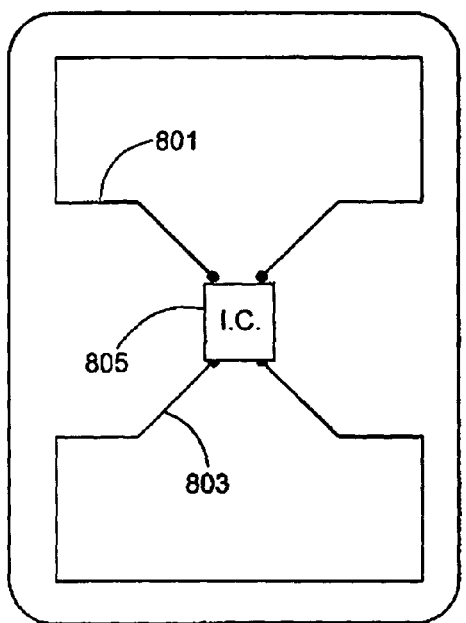
FIG. 8 is a plan view of an RF-enabled card using a pair of single-loop antennas to detect the position of a nearby conductive object.

For example, FIG. 8 illustrates and RFID card 800 employing two single-loop antennas 801 and 803 both of which are connected to on-card integrated circuit 805. Single loop and printed circuit array antennas suitable for use in RFID cards and tags, and their interconnection with on-card electronics, are described in U.S. Pat. No. 6,100,804 issued on Aug. 8, 2000 to Brady et al., the disclosure of which is incorporated herein by reference. The antennas 801 and 802 are configured to operate in phase with respect to distant objects, such as the antenna of the remote reader which is electromagnetically coupled to both antennas. However, sensing means in the IC 805 may be employed to detect the influence of a conductive object near to one of the antennas but not the other, causing the gain, resonant frequency or Q of one antenna to change with respect to the other. This effect may also be used to detect motion of the nearby object in a direction parallel to the long dimension of the card 800, permitting the detecting of a characteristic signature motion by the cardholders hand or finger. The two antennas may also be connected to the I.C. 805 in phase opposition, so that the IC and the remote antenna communicate with the reader first using one antenna and then the other, permitting influences on operating characteristics of one antenna in comparison to the other to be detected at the reader. The relative influence of a nearby object on the two spaced apart antennas 801 and 803 allows the position and motion of the conductive object with respect to the long dimension of the card to determined.

Figure 9:
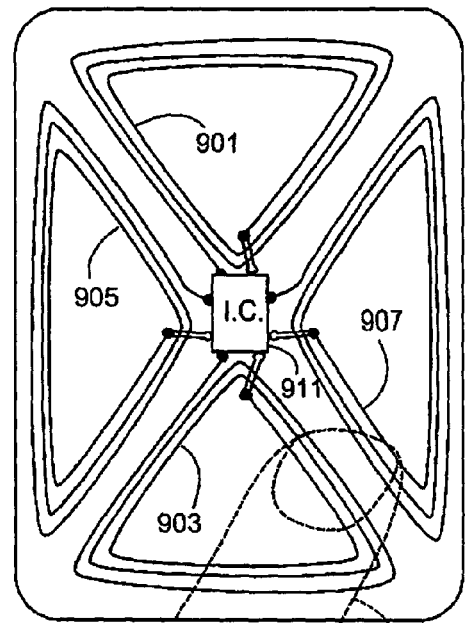
FIG. 9 is a plan view of an RF-enabled card using four multiloop antennas for detecting the position of a nearby conductive object.

FIG. 9 shows an alternative arrangement using four triangular multi-loop antennas 901, 903, 905 and 907 connected to an integrated circuit 911, with each opposing pair of antennas (901 and 903, and 905 and 907) providing a mechanism for detection the position of a proximate conductive object along one coordinate of a two-dimensional area of the card. Multiple loop antennas and their interconnection with on-card integrated circuitry are described in U.S. Pat. No. 6,496,113 issued to Lee et al. on Dec. 17, 2002, the disclosure of which is incorporated herein by reference. The position of the cardholder's finger near the surface of the card may be detected by comparing the operating characteristics of the pair of antennas 901 and 903 (to determine the relative position of the finger with respect to the long dimension of the card) and comparing the operating characteristics of antennas 905 and 907 (to determine the position of the finger with respect to the short dimension of the card). The movement of the cardholder's finger in these two dimensions may be detected to identify characteristic signature movements, or the cardholder's finger may be moved toward and away from different positions on the card in a touching motion, with the position of each touch being detected to provide a "virtual keypad" which the cardholder may used to enter identification or data signals.

Figure 10:
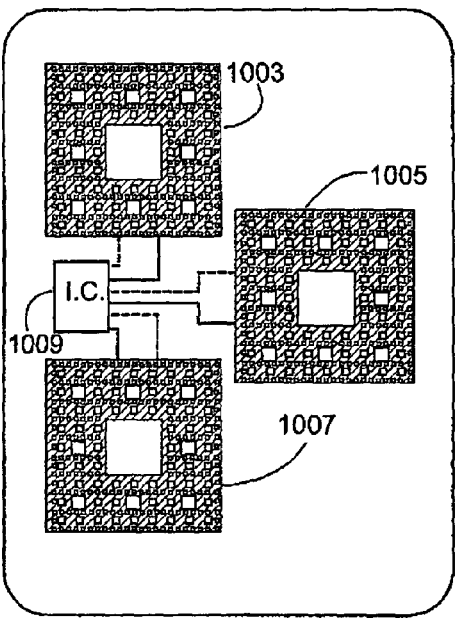
FIG. 10 is a plan view of an RF-enabled card using three fractal patch antennas for detecting the position of a nearby conductive object.

FIG. 10 shows three fractal patch antennas 1003, 1005 and 1007 connected to an integrated circuit 1009 for detecting the position of a conductive object relative to the surface region of card by triangulation. Each fractal antenna may consist of a pair of conductive panels on or near each surface of the card and separated by a dielectric layer, with each panel being connected to one of the two conductors leading to the I.C. 1009. Alternatively, the patch antennas may be continuous unperforated panels positioned over a continuous conductive ground plane on the opposing surface of the card, with the patch being connected to one lead to the IC 1009 and the second lead being connected to the ground plane. Fractal patch antennas of the type shown in FIG. 10 are described in detail in U.S. Pat. No. 6,127,977 which issued Nathan Cohen on Oct. 3, 2000, and planar patch antennas are also described in U.S. Pat. No. 6,215,402 which issued to Rao Kodukula et al. on Apr. 10, 2001

Figure 11:
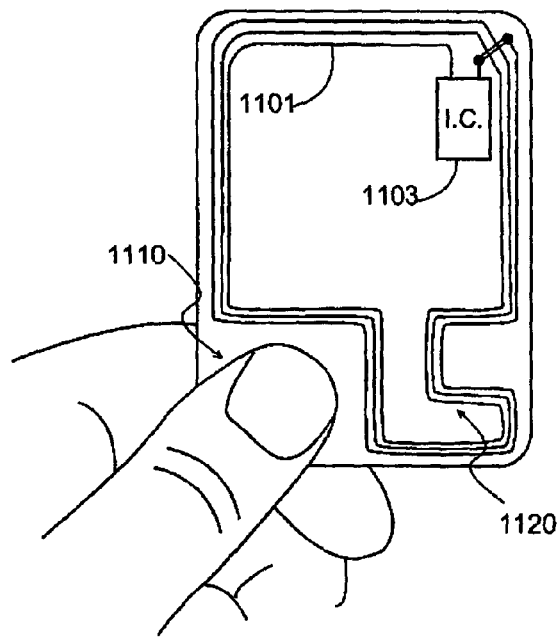
FIG. 11 is a plan view of an RF-enabled card using a single, multi-loop asymmetrical antenna for detecting the position of a nearby conductive object.

FIG. 11 shows still another illustrative embodiment of the invention using a single, asymmetrical loop antenna 1101 connected to an integrated circuit 1103, with the winding 1101 being shaped such that its windings avoid one corner of the card at 1110 while several closely spaced windings are located at the neighboring corner 1120. The anisotropic properties of the antenna 1101 allow the card to grasped by the cardholder at the corner 1110 as shown in FIG. 11 without substantially altering the "free-space" characteristics of the antenna, whereas as if the card is grasped at the corner 1120 the gain, Q and resonant frequency of the antenna will be substantially changed. The cardholder my manipulate the card in a predetermined way, for example by grasping the card first at the corner 1110 with the left hand as shown, and then grasping the card at the corner 1120 with the right hand, in alternation several times in succession, with the resulting predetermined change in the antennas operating characteristics being detected by either the on-card IC 1103 or the remote reader to enable the card for data exchange.

Figure 12:
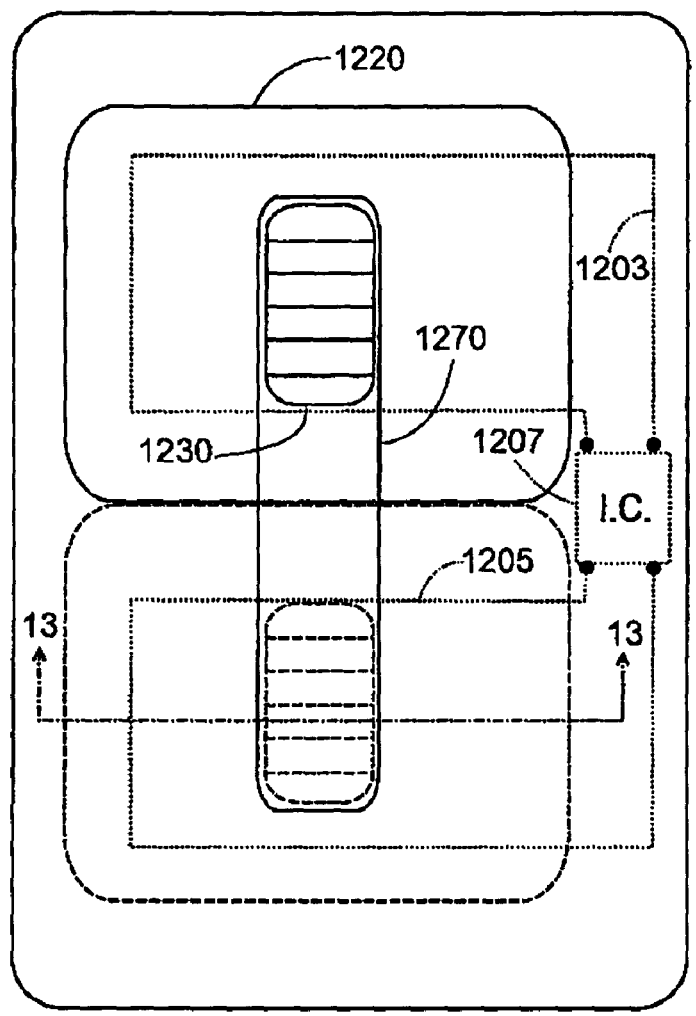
FIGS. 12 and 13 are plan and cross-section views respectively of an RF-enabled card that uses a sliding conductive member on the card to selectively change the performance of two single loop antennas.
Figure 13:
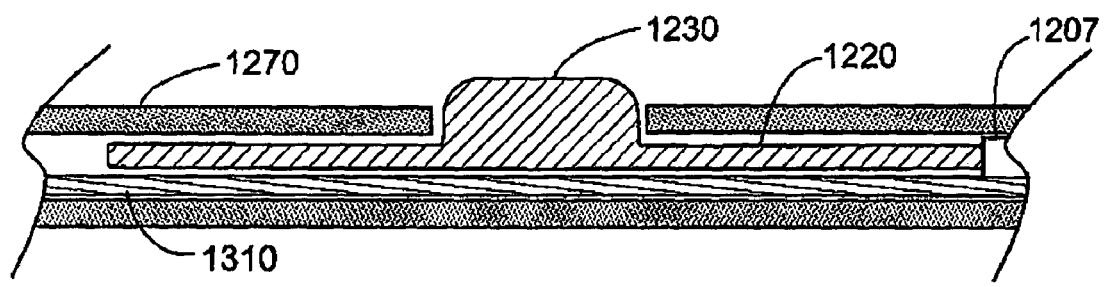

FIGS. 12 and 13 shows an RF-enabled card which employs a pair of single loop antennas 1203 and 1205 connected to an integrated circuit 1207, the antennas and the connected IC having the same configuration as shown in FIG. 8. A moveable conductive member is mounted for sliding movement in the card 1210 and consists of a generally rectangular plate 1220 and a centrally-located raised island 1230 with a knurled surface. As seen in cross-section in FIG. 13, the center island 1230 protrudes through an elongated slot 1150 formed in one surface 1270 of the card. The antenna structure is formed by conductive traces on a substrate seen at 1310 in FIG. 13 upon which also supports the integrated circuit 1207.

The system may be implemented using a variety of transceiver designs that can recognize changes antenna transmission characteristics. For example, the on-card electronics or the reader can measuring the standing wave ratio that exists on the transmission link between the card and the reader. Alternatively, as described above, changes in the resonant frequency of the antenna structure may be detected, or the amplitude changes that result from changes in antenna gain with changes in finger proximity can be detected. Multiple antennas may be used as illustrated in FIGS. 8–10 and 12 may be used to provide the ability to sense the location of the user's finger or hand in one, two or three dimensions. The on-card antennas can be designed as a simple coil, a patch or, as illustrated in FIG. 11, a special anisotropic antenna design employing a single asymmetrical shaped loop or structure may be used to sense the position or movement of the cardholder's hand or a conductive member such as a stylus.

The antenna and switching structures which have been described may be used in connection with both active and passive RFID cards to enable the cardholder to activate the card, provide a recognizable user-signature or indication which would is required to enable the card, or to manipulate the card in various ways to enter data for storage or transmission. In an active card in which the on-card electronics is powered by a battery, or a passive card in which the on-card electronics is powered by electromagnetic energy received from the remote reader, the actuation of one or more on-card switching elements by the cardholder, or the measurable effect that the presence of an conductive object has on the performance of one or more on card antennas, may be sensed by the on-card electronics to provide an enabling signal or data entry. In the alternative, the activation of an on-card switching element, or the effect of the presence of a nearby conductive element on one or more on-card antenna, may be sensed by the remote reader, reducing the cost of the on-card electronics.

The exterior surface of the card may advantageously include printed matter (such as a printed keypad or the like), or surface features that may be detected by touch, to help guide the cardholder in manipulating the card in a particular way.

CONCLUSION

It is to be understood that the methods and apparatus which have been described above are merely illustrative applications of the principles of the invention. Numerous modifications may be made by those skilled in the are without departing from the true spirit and scope of the invention.

What is claimed is:

1. An RFID card adapted to be carried by and activated by a human cardholder comprising, in combination,
    a transceiver on said card for exchanging data between said RFID card and a remotely located card reader electromagnetically coupled to said card,
    at least one sensor on said card operable by said cardholder to generate a plurality of control signals indicating the timing of a corresponding sequence of touch events when said card is being manipulated by said cardholder, and
    a timer responsive to said control signals for controlling the data exchanged between said RFID card and said card reader when the time duration between touch events in said sequence satisfies a predetermined condition.

2. An RFID card adapted to be carried by and activated by a human cardholder as set forth in claim 1 wherein said control signals further indicate a location on said card where said touch events occur.

3. An RFID card adapted to be carried by and activated by a human cardholder as set forth in claim 2 wherein said sensor comprises a plurality of switching elements located at different positions on a surface of said card.

4. An RFID card adapted to be carried by and activated by a human cardholder as set forth in claim 3 wherein said transceiver is electromagnetically coupled to said card reader by an antenna and wherein each of said plurality of switching elements are connected to said antenna to vary the gain or resonant frequency of said antenna.

5. An RFID card adapted to be carried by and activated by a human cardholder as set forth in claim 2 wherein said switching elements are activated by selective positioning of the cardholder's hand with respect to said card.

6. An RFID card adapted to be carried by and activated by a human cardholder comprising
    an on-card antenna defining of a plurality of spaced apart regions of said RFID card and having a different response to the presence of a conductive object positioned proximate to different ones of said regions of said card,
    sensing means coupled to said antenna for detecting the timing and sequence in which said conductive object moves with respect to said spaced apart regions, and
    a timer for controlling the operation of said RFID card when said timing and sequence satisfies one or more predetermined time duration conditions.

7. An RFID card adapted to be carried by and activated by a human cardholder as set forth in claim 6 wherein said sensing means detects a change in the Q of said antenna in the presence of said object.

8. An RFID card adapted to be carried by and activated by a human cardholder as set forth in claim 6 wherein said sensing means detects a change in the amplitude gain of said antenna in the presence of said object.

9. An RFID card adapted to be carried by and activated by a human cardholder as set forth in claim 6 wherein said conductive object is a human hand.

10. An RFID card adapted to be carried by and activated by a human cardholder as set forth in claim 6 wherein said conductive object is a conductive member mounted on said card for movement with respect to said on-card antenna to alter the characteristics of said antenna.

11. A radio operated data card carried by and activated by a human cardholder including, on said card,
    an antenna,
    a data memory,
    a transceiver for transferring data between said memory and a remote host system via said antenna,
    a sensing mechanism for generating control signals indicative of the position at which, and the timing at which, said cardholder touches each of a plurality of different locations on said card in sequence, and
    means including at least one timer for controlling the transfer of data via said transceiver when said control signals satisfy predetermined conditions indicating that said card was touched at predetermined locations in a predetermined sequence satisfying predetermined time duration constraints.

12. A radio operated data card as set forth in claim 11 wherein said antenna comprises different segments and wherein said sensing mechanism sensor detects a change in the Q of said antenna.

13. A radio operated data card as set forth in claim 11 wherein said antenna comprises different segments and said sensing mechanism detects a change in the standing wave ratio exhibited by said different segments.

14. A radio operated data card as set forth in claim 11 wherein said antenna comprises different segments and said sensing mechanism detects change in the amplitude gain of said antenna segments.

15. A radio operated data card as set forth in claim 11 wherein said antenna comprises different segments and said sensing mechanism detects a change in the resonant frequency of said one or more antenna segments in the presence of an object.

* * * * *